United States Patent
Adler

(10) Patent No.: US 6,899,115 B1
(45) Date of Patent: May 31, 2005

(54) METHOD AND FILLING STATION FOR FILLING A MOTOR VEHICLE WITH GASEOUS FUEL

(75) Inventor: Robert Adler, Gerasdorf (AT)

(73) Assignee: Linde AG, Wiesbaden (DE)

( * ) Notice: Subject to any disclaimer, the term of this patent is extended or adjusted under 35 U.S.C. 154(b) by 311 days.

(21) Appl. No.: 10/031,568

(22) PCT Filed: Jul. 19, 2000

(86) PCT No.: PCT/EP00/06900

§ 371 (c)(1),
(2), (4) Date: May 20, 2002

(87) PCT Pub. No.: WO01/06172

PCT Pub. Date: Jan. 25, 2001

(30) Foreign Application Priority Data

Jul. 20, 1999 (DE) ................................. 199 33 791

(51) Int. Cl.⁷ .............................................. F01M 9/00
(52) U.S. Cl. ............................. 137/13; 137/237; 141/2; 141/11; 141/18; 141/104; 141/197; 44/346
(58) Field of Search ............................. 62/7, 46.1, 501, 62/50.3, 50.7; 44/300, 301, 346; 137/13, 137/237, 565.3; 141/2, 9, 11, 18, 100, 104, 141/197

(56) References Cited

U.S. PATENT DOCUMENTS

| 2,663,669 | A | * | 12/1953 | Barnes .......................... 208/340 |
| 3,879,176 | A | | 4/1975 | Tsunemi |
| 3,909,215 | A | * | 9/1975 | Kray ............................. 44/346 |
| 4,132,535 | A | * | 1/1979 | Rivers et al. .................... 95/42 |
| 4,183,369 | A | * | 1/1980 | Thomas ......................... 137/13 |
| 4,609,379 | A | * | 9/1986 | Kitchen, III ................... 44/336 |
| 4,805,674 | A | | 2/1989 | Knowlton |
| 5,160,506 | A | | 11/1992 | Schur et al. |
| 5,409,046 | A | * | 4/1995 | Swenson et al. ............... 141/11 |
| 5,538,051 | A | * | 7/1996 | Brown et al. .................. 141/18 |
| 5,630,328 | A | * | 5/1997 | Hise et al. ....................... 62/7 |
| 5,687,776 | A | * | 11/1997 | Forgash et al. ............... 141/11 |
| 5,694,985 | A | * | 12/1997 | Diggins ........................... 141/4 |
| 5,769,058 | A | * | 6/1998 | Scogin ......................... 123/527 |
| 5,782,936 | A | * | 7/1998 | Riley ............................ 44/300 |
| 6,227,823 | B1 | * | 5/2001 | Paul et al. .................... 417/440 |

FOREIGN PATENT DOCUMENTS

| DE | 690417 | 4/1940 |
| DE | 19650999 | 6/1998 |

* cited by examiner

Primary Examiner—George L. Walton
(74) Attorney, Agent, or Firm—Millen, White, Zelano & Branigan, P.C.

(57) ABSTRACT

The invention relates to a method and a filling station for filling a motor vehicle with gaseous fuel. The fuel is compressed, stored temporarily and expanded in the fuel tank of said vehicle. The fuel has a high water content. According to the invention, oil or an oil mixture is added in a dosed manner to said fuel.

14 Claims, 1 Drawing Sheet

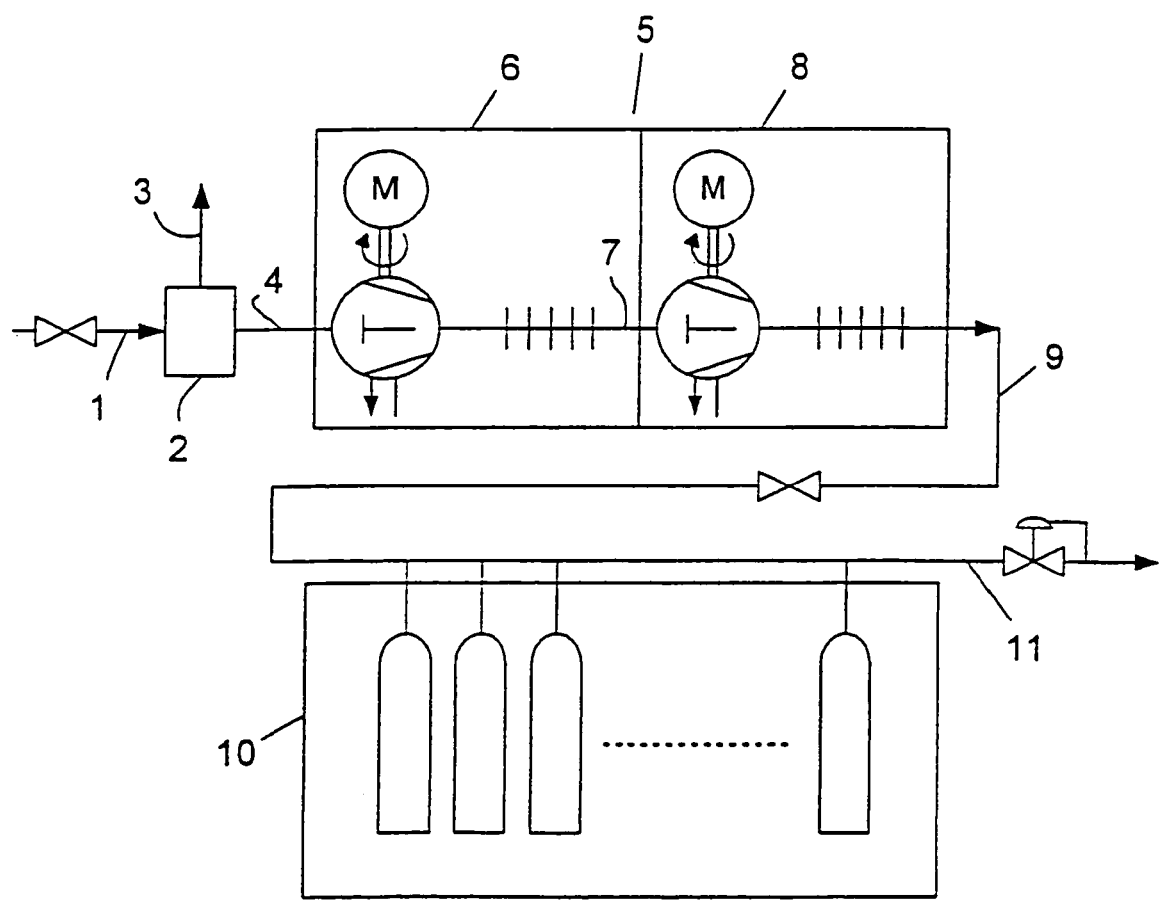
Fig.

METHOD AND FILLING STATION FOR FILLING A MOTOR VEHICLE WITH GASEOUS FUEL

The invention relates to a process and a filling station for filling a vehicle with a gaseous fuel, wherein the fuel is compressed, put in temporary storage, and expanded in the vehicle tank, and wherein the fuel has a high hydrogen content.

The invention further relates to a filling station for the process according to the invention with a compressor station and a high-pressure (HP) storage vessel for the gaseous fuel.

In using natural gas a fuel for internal combustion engines, great wear and tear occurs during a cold start since, because of the high hydrogen content in the fuel, a part of the water vapor resulting from the combustion condenses on the cold cylinder wall of the engine. Because of the high piston speeds in the internal combustion engine of about 7 m/s, the water drops condensed on the cylinder wall are accelerated by the pistons, practically without transition time, to the piston speed. This leads to cavitation effects, which destroy the cylinder wall. This makes the condensed water better able to attack and rust the cylinder wall. In engines that are cold started very often, this leads to about a 30% shortening of its service life. Practically all energy carriers with high hydrogen content lead to these damages.

The object of the invention is to avoid the mentioned drawbacks.

This object is achieved according to the invention by a process with the features of claim 1 and by a filling station with the features of claim 6. Embodiments of the invention are the object of subclaims.

The distinguishing feature of the process according to the invention is that an oil or an oil mixture (additive) is added by doses to the fuel. When an internal combustion engine is cold-started, the oil spray condenses on the cold cylinder wall during the suction stroke (partial vacuum) and covers it with a protective sliding layer, off of which the subsequently condensing water drops slide. This prevents the occurrence of cavitation. Further, the additive destroys the surface tension of the water, largely preventing the formation of drops.

In one configuration of the process according to the invention, the oil or the oil mixture can contain mineral oil and/or synthetic oil.

The fuel can contain the hydrogen as a hydrogen molecule and/or as a hydrocarbon.

The oil or oil mixture can be added so that the highest fuel pressure occurring during filling remains below the saturated vapor pressure of the oil or a component of the oil. This has the advantage that, during storage of the fuel under pressure following the compression, no condensation of oil or of oil components can occur. Only during expansion in the vehicle tank does the desired oil spray appear.

The distinguishing feature of the filling station according to the invention is that the filling station contains a dosing mechanism for oil or an oil mixture (additive). The dosing mechanism makes it possible to dose continually, controlled by the fuel flow rate. But a simpler configuration with constant dosing, designed for an average fuel flow rate of the compressor fraction, can also be provided. The addition of the additive considerably prolongs the engine service life.

The dosing mechanism can be upstream from the fuel-compressor station or between two compressor stages. The high feed pressure that would be necessary argues against feeding in the additive beyond the compressor station.

The invention will be explained in more detail based on an embodiment with a FIGURE.

Natural gas is withdrawn from a pipeline at a pipeline pressure between, for example, 1 and 10 bars and processed as necessary for use in internal combustion engines: For example, particles are removed and the natural gas is dried to less than 10 mole-ppm. (This processing is not shown in the FIGURE.)

Oil 3 is mixed with the help of a dosing mechanism into natural gas stream 1 prepared this way so that stream 4 contains about 40 to 60 mole-ppm of oil. Stream 4 is fed to a compressor station 5 and compressed in a first compression stage 6 to an intermediate pressure, cooled, compressed as stream 7 in a second compression stage 8 to a final pressure and again cooled. High pressure stream 9 thus obtained is used to fill a high pressure storage vessel 10 up to maximum storage pressure. The filling of vehicles is done from storage vessel 10 by expanding a high pressure stream 11 in the respective vehicle tank until its maximum filling pressure, for example 200 bars, is reached.

What is claimed is:

1. A process for filling a vehicle tank with a gaseous fuel having a high content of hydrogen atoms, wherein the fuel is compressed, fed to temporary storage, and from said temporary storage is expanded in the vehicle tank, the improvement comprising adding an oil or an oil mixture in doses to the fuel upstream of said temporary storage.

2. Process according to claim 1, wherein the gas stream to be compressed contains methane or hydrogen or a mixture of methane and hydrogen.

3. Process according to claim 1, wherein the gas stream to be compressed contains a natural gas or a methane-containing fraction of a natural gas.

4. A process according to claim 1, wherein the fuel contains the hydrogen atoms as a hydrogen molecule and/or as a hydrocarbon.

5. Process according to claim 1, wherein the oil or mixture is added so that the highest fuel pressure occurring during the filling remains below the saturation vapor pressure of the oil or a component of the oil.

6. A filling station for performing the process according to claim 1, comprising a compressor station for gaseous fuel and in communication with said compressor station, a high-pressure (HP) storage vessel means comprising compressed gaseous fuel, and wherein the filling station contains means for dosing oil or an oil mixture to said gaseous fuel, said means for dosing being located upstream of said HP storage vessel means.

7. A filling station according to claim 6, wherein the means for dosing is disposed upstream from the compressor station.

8. A filling station according to claim 6, wherein the means for dosing is placed between two compressor stages.

9. A filling station according to claim 6, wherein the HP storage vessel means comprises a plurality of cylindrical storage vessels.

10. A filling station according to claim 7, wherein the HP storage vessel means comprises a plurality of cylindrical storage vessels.

11. A filling station according to claim 8, wherein the HP storage vessel means comprises a plurality of cylindrical storage vessels.

12. A process according to claim 1, wherein the fuel is dosed with the oil or oil mixture before the fuel is compressed.

13. A process according to claim 12, wherein the resultant dosed fuel is natural gas having a content of 40–60 ppm mol of said oil or oil mixture.

14. A process according to claim 1, wherein the fuel is compressed in two compressor stages and the fuel is dosed with the oil or oil mixture between the two compressor stages.

* * * * *